US009654775B2

(12) United States Patent
Li et al.

(10) Patent No.: US 9,654,775 B2
(45) Date of Patent: May 16, 2017

(54) VIDEO ENCODER WITH WEIGHTED PREDICTION AND METHODS FOR USE THEREWITH

(71) Applicant: ViXS Systems, Inc., Toronto (CA)

(72) Inventors: Ying Li, Richmond Hill (CA); Xu Gang Zhao, Maple (CA)

(73) Assignee: VIXS SYSTEMS, INC., Toronto (CA)

( * ) Notice: Subject to any disclaimer, the term of this patent is extended or adjusted under 35 U.S.C. 154(b) by 459 days.

(21) Appl. No.: 14/151,019

(22) Filed: Jan. 9, 2014

(65) Prior Publication Data

US 2015/0195524 A1 Jul. 9, 2015

(51) Int. Cl.
| | |
|---|---|
| *H04N 19/196* | (2014.01) |
| *H04N 19/56* | (2014.01) |
| *H04N 19/103* | (2014.01) |
| *H04N 19/109* | (2014.01) |
| *H04N 19/46* | (2014.01) |
| *H04N 19/30* | (2014.01) |
| *H04N 19/14* | (2014.01) |
| *H04N 19/187* | (2014.01) |
| *H04N 19/577* | (2014.01) |
| *H04N 19/154* | (2014.01) |

(52) U.S. Cl.
CPC .......... *H04N 19/109* (2014.11); *H04N 19/14* (2014.11); *H04N 19/187* (2014.11); *H04N 19/30* (2014.11); *H04N 19/46* (2014.11); *H04N 19/577* (2014.11); *H04N 19/154* (2014.11)

(58) Field of Classification Search
CPC .... H04N 19/109; H04N 19/14; H04N 19/154; H04N 19/187; H04N 19/30; H04N 19/46; H04N 19/577
See application file for complete search history.

(56) References Cited

U.S. PATENT DOCUMENTS

| | | | | |
|---|---|---|---|---|
| 2008/0117971 | A1* | 5/2008 | Ramachandran | H04N 19/176 375/240.16 |
| 2008/0304572 | A1* | 12/2008 | Murakami | H04N 19/176 375/240.25 |
| 2012/0230405 | A1* | 9/2012 | An | H04N 19/105 375/240.13 |
| 2013/0163666 | A1* | 6/2013 | Leontaris | H04N 19/00569 375/240.12 |
| 2013/0259130 | A1* | 10/2013 | Coban | H04N 19/00575 375/240.15 |

* cited by examiner

Primary Examiner — MD Haque
(74) Attorney, Agent, or Firm — Garlick & Markison; Bruce E. Stuckman

(57) ABSTRACT

A weighted prediction module includes a weighted prediction parameter generation module configured to generate a plurality of initial weighted prediction parameters, to analyze the plurality of initial weighted prediction parameters, and to generate a refinement flag that indicates one of: enable parameter refinement and disable parameter refinement. A weighted prediction parameter refinement module is configured to generate a plurality of refined weighted prediction parameters by refining the plurality of initial weighted prediction parameters, when the refinement flag indicates that the parameter refinement is enabled. A weighted prediction flag generation module is configured to generate a weighted prediction flag that indicates one of: enable weighted prediction and disable weighted prediction, based on the refinement flag.

16 Claims, 10 Drawing Sheets

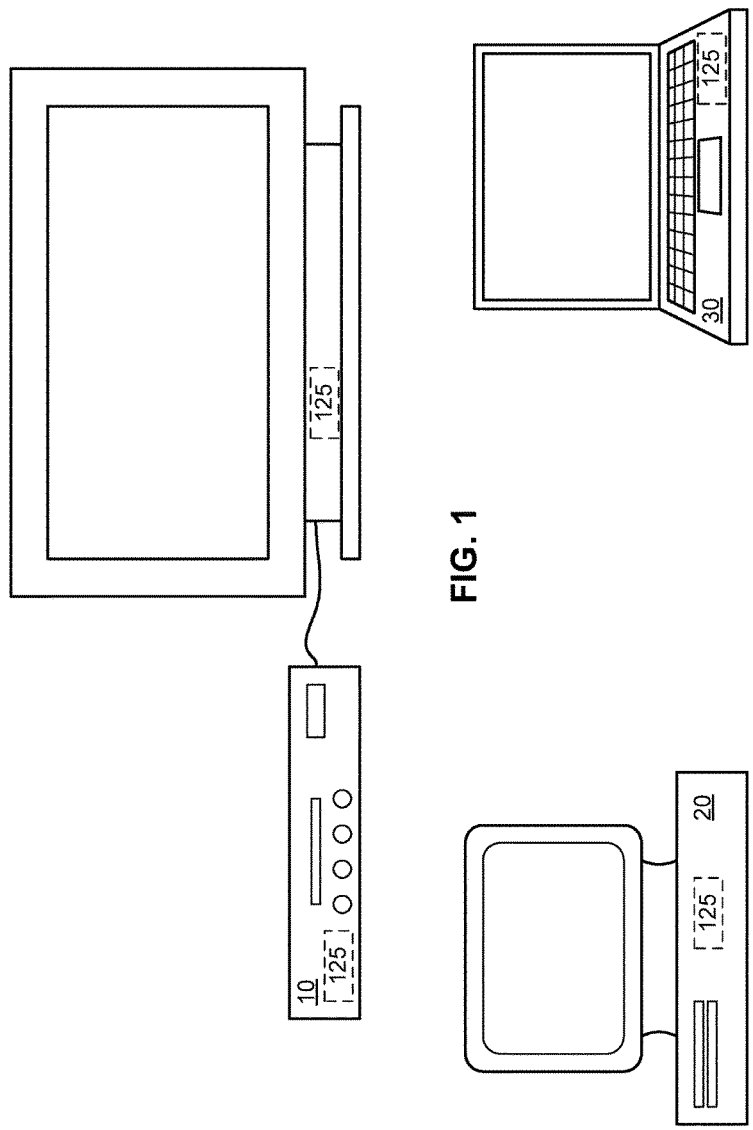

Video encoding operation

Video decoding operation

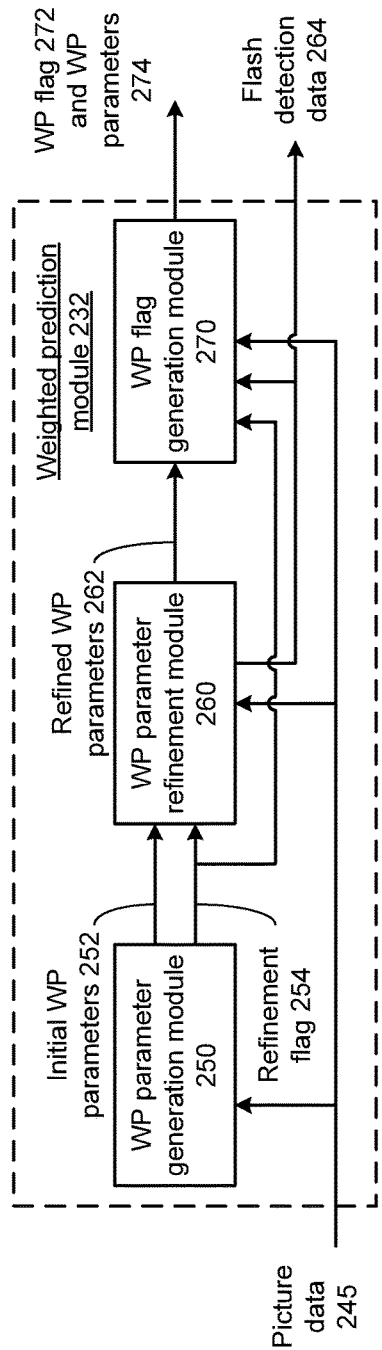
FIG. 8
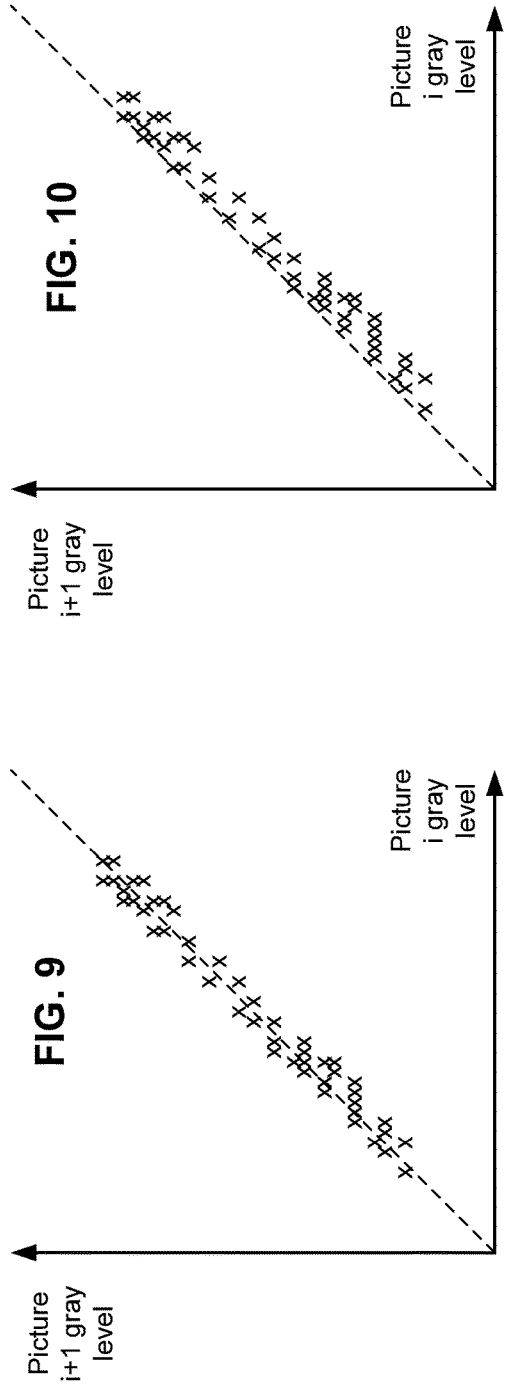
FIG. 9
FIG. 10

VIDEO ENCODER WITH WEIGHTED PREDICTION AND METHODS FOR USE THEREWITH

CROSS REFERENCE TO RELATED PATENTS

Not Applicable

TECHNICAL FIELD

The present disclosure relates to encoding used in devices such as video encoders/decoders.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. The video signal encoded by these encoding methods must be similarly decoded for playback on most video display devices.

Efficient and fast encoding and decoding of video signals is important to the implementation of many video devices, particularly video devices that are destined for home use. Motion estimation can be important to video encoding. Accurate motion estimation saves bits in encoding and can also be important for encoding quality, especially at high quantization levels.

BRIEF DESCRIPTION OF THE SEVERAL VIEWS OF THE DRAWINGS

FIGS. 1-3 present pictorial diagram representations of various video devices in accordance with embodiments of the present disclosure.

FIG. 8 presents a block diagram representation of a weighted prediction module in accordance with an embodiment of the present disclosure.

FIGS. 9-12 present graphical representations of joint intensity histograms in accordance with an embodiment of the present disclosure.

DETAILED DESCRIPTION

FIGS. 1-3 present pictorial diagram representations of various video devices in accordance with embodiments of the present disclosure. In particular, set top box 10 with built-in digital video recorder functionality or a stand alone digital video recorder, computer 20 and portable computer 30 illustrate electronic devices that incorporate a video processing device 125 that includes one or more features or functions of the present disclosure. While these particular devices are illustrated, video processing device 125 includes any device that is capable of encoding, decoding and/or transcoding video content in accordance with the methods and systems described in conjunction with FIGS. 4-15 and the appended claims.

Figure 4:
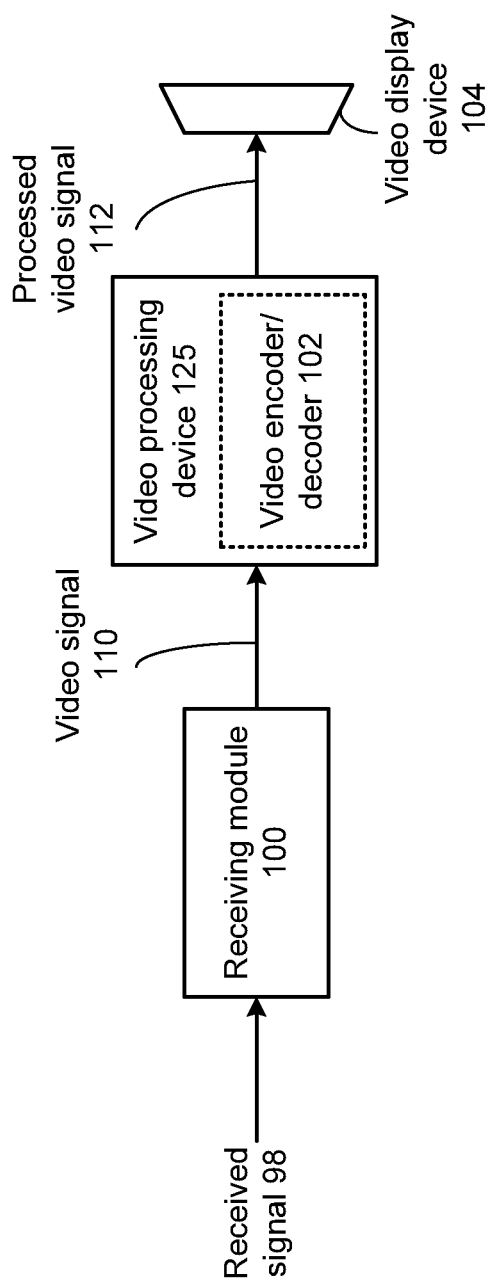
FIG. 4 presents a block diagram representation of a video device in accordance with an embodiment of the present disclosure.

FIG. 4 presents a block diagram representation of a video device in accordance with an embodiment of the present disclosure. In particular, this video device includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video processing device 125 includes video encoder/decoder 102 and is coupled to the receiving module 100 to encode, decode or transcode the video signal for storage, editing, and/or playback in a format corresponding to video display device 104.

In an embodiment of the present disclosure, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal 112 can include a digital video signal complying with a digital video codec standard such as H.264, MPEG-4 Part 10 Advanced Video Coding (AVC) or another digital format such as a Motion Picture Experts Group (MPEG) format (such as MPEG1, MPEG2 or MPEG4), QuickTime format, Real Media format, Windows Media Video (WMV) or Audio Video Interleave (AVI), etc.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Figure 5:
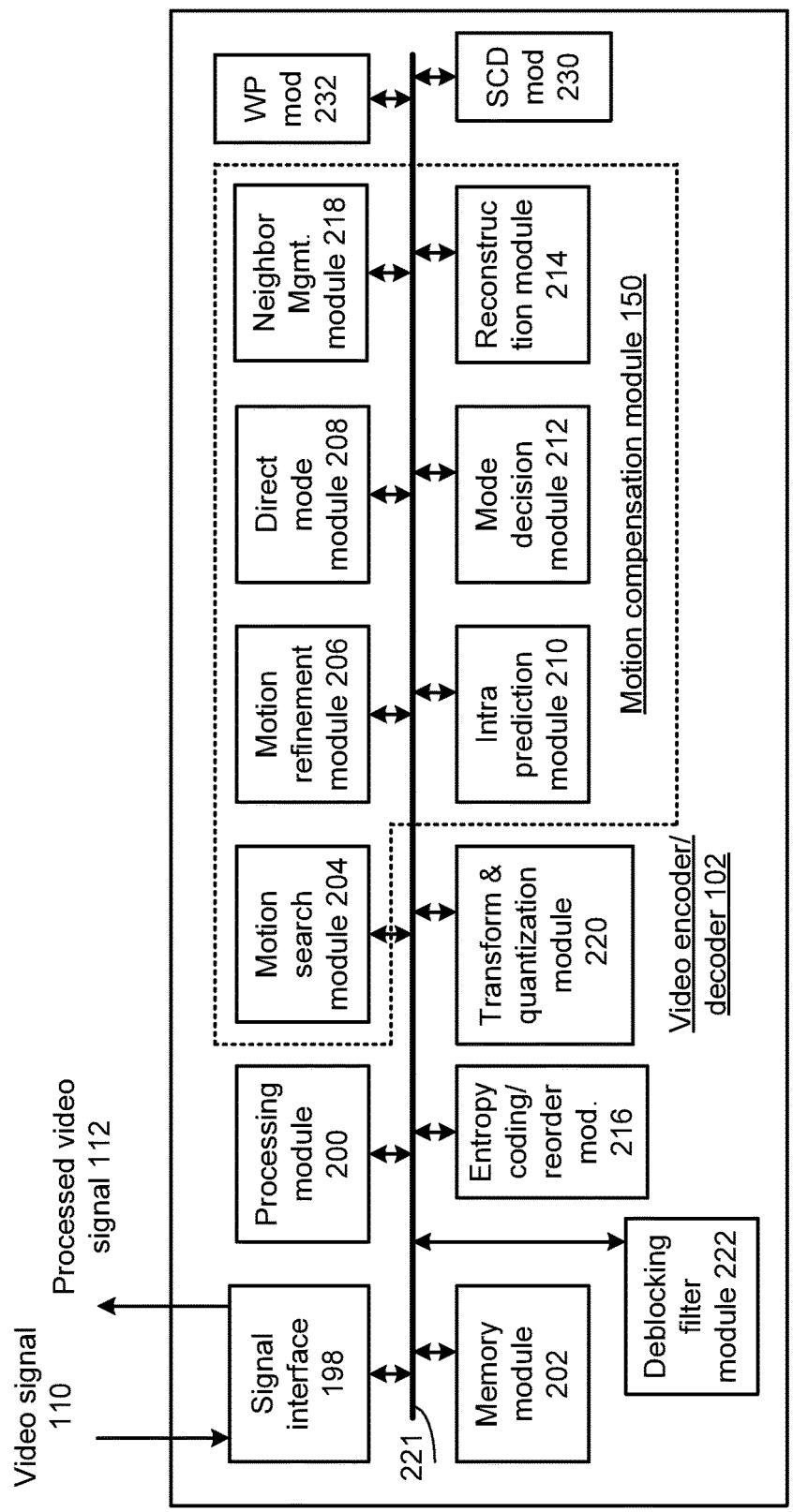
FIG. 5 presents a block diagram representation of a video encoder/decoder in accordance with an embodiment of the present disclosure.

FIG. 5 presents a block diagram representation of a video encoder/decoder in accordance with an embodiment of the present disclosure. In particular, video encoder/decoder 102 can be a video codec that operates in accordance with many of the functions and features of the High Efficiency Video Coding standard (HEVC), H.264 standard, the MPEG-4 standard, VC-1 (SMPTE standard 421M) or other standard, to generate processed video signal 112 by encoding, decoding or transcoding video signal 110. Video signal 110 is optionally formatted by signal interface 198 for encoding, decoding or transcoding.

The video encoder/decoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 221, to the signal interface 198 and a plurality of other modules, such as motion search module 204, motion refinement module 206, direct mode module 208, intra-prediction module 210, mode decision module 212, reconstruction module 214, entropy coding/reorder module 216, neighbor management module 218, forward transform and quantization module 220, deblocking filter module 222, scene detection module 230 and weighted prediction module 232. In an embodiment of the present disclosure, the modules of video encoder/decoder 102 can be implemented via an XCODE processing device sold by VIXS Systems, Inc. along with software or firmware. Alternatively, one or more of these modules can be implemented using other hardware, such as another processor or a hardware engine that includes a state machine, analog circuitry, digital circuitry, and/or logic circuitry, and that operates either independently or under the control and/or direction of processing module 200 or one or more of the other modules, depending on the particular implementation. It should also be noted that the software implementations of the present disclosure can be stored on a tangible storage medium such as a magnetic or optical disk, read-only memory or random access memory and also be produced as an article of manufacture.

While a particular bus architecture is shown, alternative architectures using direct connectivity between one or more modules and/or additional busses can likewise be implemented in accordance with the present disclosure. Further, while weighted prediction module 232 is shown separately from motion compensation module 150 and scene detection module 230, the weighted prediction module 232 can be implemented in conjunction with the motion compensation module 150 or scene detection module 230 as a submodule.

Video encoder/decoder 102 can operate in various modes of operation that include an encoding mode and a decoding mode that is set by the value of a mode selection signal that may be a user defined parameter, user input, register value, memory value or other signal. In addition, in video encoder/decoder 102, the particular standard used by the encoding or decoding mode to encode or decode the input signal can be determined by a standard selection signal that also may be a user defined parameter, user input, register value, memory value or other signal. In an embodiment of the present disclosure, the operation of the encoding mode utilizes a plurality of modules that each perform a specific encoding function. The operation of decoding also utilizes at least one of these plurality of modules to perform a similar function in decoding. In this fashion, modules such as the motion refinement module 206 and more particularly an interpolation filter used therein, and intra-prediction module 210, can be used in both the encoding and decoding process to save on architectural real estate when video encoder/decoder 102 is implemented on an integrated circuit or to achieve other efficiencies. In addition, some or all of the components of the direct mode module 208, mode decision module 212, reconstruction module 214, transformation and quantization module 220, deblocking filter module 222 or other function specific modules can be used in both the encoding and decoding process for similar purposes.

Motion compensation module 150 includes a motion search module 204 that processes pictures from the video signal 110 based on a segmentation into macroblocks of pixel values, such as of 64 pixels by 64 pixels, 32 pixels by 32 pixels, 16 pixels by 16 pixels or some other size, from the columns and rows of a frame and/or field of the video signal 110. In an embodiment of the present disclosure, the motion search module determines, for each macroblock or macroblock pair of a field and/or frame of the video signal, one or more motion vectors that represents the displacement of the macroblock (or subblock) from a reference frame or reference field of the video signal to a current frame or field. In operation, the motion search module operates within a search range to locate a macroblock (or subblock) in the current frame or field to an integer pixel level accuracy such as to a resolution of 1-pixel. Candidate locations are evaluated based on a cost formulation to determine the location and corresponding motion vector that have a most favorable (such as lowest) cost.

While motion search module 204 has been described above in conjunction with full resolution search, motion search module 204 can operate to determine candidate motion search motion vectors partly based on scaled or reduced resolution pictures. In particular, motion search module 204 can operate by downscaling incoming pictures and reference pictures to generate a plurality of downscaled pictures. The motion search module 204 then generates a plurality of motion vector candidates at a downscaled resolution, based on the downscaled pictures. The motion search module 204 operates on full-scale pictures to generate motion search motion vectors at full resolution, based on the motion vector candidates. In another embodiment, the motion search module 204 can generate motion search motion vectors for later refinement by motion refinement module 206, based entirely on pictures at downscaled resolution.

Motion estimation can be important to video encoding. Accurate motion estimation saves bits in encoding and can also be important for encoding quality, especially at high quantization levels. On many video streams, there are regions with little details. When smaller block size is used for motion estimation, there are lots of similar local cost minima. If bigger block size is used, search results of bigger regions covered by blocks containing different motion may be wrong.

In an embodiment of the present disclosure, the motion search module 204 determines a motion search motion vector for a region of a selected picture via a dynamic search region and block merging methodology. In particular, the motion search module 204 determines the region by merging selected ones of a plurality of blocks of the selected picture based on an evaluation of a cost matrix associated with the plurality of blocks of the selected picture. This methodology can be efficient when adopted in scaled motion estimation and/or for regions with little details or repeat patterns, especially for HEVC, which supports many options of block partitioning.

A motion refinement module 206 generates a refined motion vector for each macroblock of the plurality of macroblocks, based on the motion search motion vector. In an embodiment of the present disclosure, the motion refinement module determines, for each macroblock or macroblock pair of a field and/or frame of the video signal 110, a refined motion vector that represents the displacement of the macroblock from a reference frame or reference field of the video signal to a current frame or field.

Based on the pixels and interpolated pixels, the motion refinement module 206 refines the location of the macroblock in the current frame or field to a greater pixel level accuracy such as to a resolution of ¼-pixel or other sub-pixel resolution. Candidate locations are also evaluated based on a cost formulation to determine the location and refined motion vector that have a most favorable (such as lowest) cost. As in the case with the motion search module, a cost formulation can be based on the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video signal or an estimated predicted motion vector that is determined based on motion vectors from neighboring current macroblocks of a prior row of the video signal. In an embodiment of the present disclosure, the cost calculation avoids the use of neighboring subblocks within the current macroblock. In this fashion, motion refinement module 206 is able to operate on a macroblock to contemporaneously determine the motion search motion vector for each subblock of the macroblock.

When estimated predicted motion vectors are used, the cost formulation avoids the use of motion vectors from the current row and both the motion search module 204 and the motion refinement module 206 can operate in parallel on an entire row of video signal 110, to contemporaneously determine the refined motion vector for each macroblock in the row.

A direct mode module 208 generates a direct mode motion vector for each macroblock, based on macroblocks that neighbor the macroblock. In an embodiment of the present disclosure, the direct mode module 208 operates to determine the direct mode motion vector and the cost associated with the direct mode motion vector based on the cost for candidate direct mode motion vectors for the B slices of video signal 110, such as in a fashion defined by the H.264 standard.

While the prior modules have focused on inter-prediction of the motion vector, intra-prediction module 210 generates a best intra prediction mode for each macroblock of the plurality of macroblocks. In an embodiment of the present disclosure, intra-prediction module 210 operates as defined by the H.264 standard, however, other intra-prediction techniques can likewise be employed. In particular, intra-prediction module 210 operates to evaluate a plurality of intra prediction modes such as an Intra-4×4 or Intra-16×16, which are luma prediction modes, chroma prediction (8×8) or other intra coding, based on motion vectors determined from neighboring macroblocks to determine the best intra prediction mode and the associated cost.

A mode decision module 212 determines a final macroblock cost for each macroblock of the plurality of macroblocks based on costs associated with the refined motion vector, the direct mode motion vector, and the best intra prediction mode, and in particular, the method that yields the most favorable (lowest) cost, or an otherwise acceptable cost. A reconstruction module 214 completes the motion compensation by generating residual luma and/or chroma pixel values for each macroblock of the plurality of macroblocks.

A forward transform and quantization module 220 of video encoder/decoder 102 generates processed video signal 112 by transforming coding and quantizing the residual pixel values into quantized transformed coefficients that can be further coded, such as by entropy coding in entropy coding module 216, filtered by de-blocking filter module 222. In an embodiment of the present disclosure, further formatting and/or buffering can optionally be performed by signal interface 198 and the processed video signal 112 can be represented as being output therefrom.

As discussed above, many of the modules of motion compensation module 150 operate based on motion vectors determined for neighboring macroblocks. Neighbor management module 218 generates and stores neighbor data for at least one macroblock of the plurality of macroblocks for retrieval by at least one of the motion search module 204, the motion refinement module 206, the direct mode module 208, intra-prediction module 210, entropy coding module 216 and deblocking filter module 222, when operating on at least one neighboring macroblock of the plurality of macroblocks. In an embodiment of the present disclosure, a data structure, such as a linked list, array or one or more registers are used to associate and store neighbor data for each macroblock in a buffer, cache, shared memory or other memory structure. Neighbor data includes motion vectors, reference indices, quantization parameters, coded-block patterns, macroblock types, intra/inter prediction module types neighboring pixel values and or other data from neighboring macroblocks and/or subblocks used by one or more of the modules or procedures of the present disclosure to calculate results for a current macroblock. For example, in order to determine the predicted motion vector for the motion search module 204 and motion refinement module 206, both the motion vectors and reference index of neighbors are required. In addition to this data, the direct mode module 208 requires the motion vectors of the co-located macroblock of previous reference pictures. The deblocking filter module 222 operates according to a set of filtering strengths determined by using the neighbors' motion vectors, quantization parameters, reference index, and coded-block-patterns, etc. For entropy coding in entropy coding module 216, the motion vector differences (MVD), macroblock types, quantization parameter delta, inter predication type, etc. are required.

Consider the example where a particular macroblock MB(x,y) requires neighbor data from macroblocks MB(x−1, y−1), MB(x, y−1), MB (x+1,y−1) and MB(x−1,y). In prior art codecs, the preparation of the neighbor data needs to calculate the location of the relevant neighbor sub-blocks. However, the calculation is not as straightforward as it was in conventional video coding standards. For example, in H.264 coding, the support of multiple partition types make the size and shape for the subblocks vary significantly. Furthermore, the support of the macroblock adaptive frame and field (MBAFF) coding allows the macroblocks to be either in frame or in field mode. For each mode, one neighbor derivation method is defined in H.264. So the calculation needs to consider each mode accordingly. In addition, in order to get all of the neighbor data required, the derivation needs to be invoked four times since there are four neighbors involved—MB(x−1, y−1), MB(x, y−1), MB(x+1, y−1), and MB(x−1, y). So the encoding of the current macroblock MB(x, y) cannot start not until the location of the four neighbors has been determined and their data have been fetched from memory.

In an embodiment of the present disclosure, when each macroblock is processed and final motion vectors and encoded data are determined, neighbor data is stored in data structures for each neighboring macroblock that will need this data. Since the neighbor data is prepared in advance, the current macroblock MB(x,y) can start right away when it is ready to be processed. The burden of pinpointing neighbors is virtually re-allocated to its preceding macroblocks. The encoding of macroblocks can therefore be more streamlined and faster. In other words, when the final motion vectors are determined for MB(x−1,y−1), neighbor data is stored for each neighboring macroblock that is yet to be processed, including MB(x,y) and also other neighboring macroblocks such as MB(x, y−1), MB(x−2,y) MB(x−1,y). Similarly, when the final motion vectors are determined for MB(x,y−1), MB (x+1,y−1) and MB(x−1,y) neighbor data is stored for each neighboring macroblock corresponding to each of these macroblocks that are yet to be processed, including MB(x, y). In this fashion, when MB(x,y) is ready to be processed, the neighbor data is already stored in a data structure that corresponds to this macroblock for fast retrieval.

The motion compensation can then proceed using the retrieved data. In particular, the motion search module 204 and/or the motion refinement module, can generate at least one predicted motion vector (such as a standard PMV or estimated predicted motion vector) for each macroblock of the plurality of macroblocks using retrieved neighbor data. Further, the direct mode module 208 can generate at least one direct mode motion vector for each macroblock of the plurality of macroblocks using retrieved neighbor data and the intra-prediction module 210 can generate the best intra prediction mode for each macroblock of the plurality of macroblocks using retrieved neighbor data, and the coding module 216 can use retrieved neighbor data in entropy coding, each as set forth in the HEVC standard, H.264 standard, the MPEG-4 standard, VC-1 (SMPTE standard 421M) or by other standard or other means.

Scene detection module 230 detects scene changes in the video signal 110 based, for example on motion detection in the video signal 110. In an embodiment of the present disclosure, scene detection module 230 generates a motion identification signal for each picture video signal 110. The motion in each picture, such as a video field (or frame if it is progressive-scan video source), can be represented by a parameter called Global Motion (GM). The value of GM quantifies the change of the field compared to the previous same-parity field. In terms of each macroblock pair, the top field is compared to the top field, bottom field compared to bottom field, etc. The value of GM can be computed as the sum of Pixel Motion (PM) over all pixels in the field or frame, where the value of PM is calculated for each pixel in the field or frame.

The parameter GM, can be used to detect a scene change in the video signal 110. When scene happens on a field, the field will generate considerably higher GM value compared to "normal" fields. A scene change can be detected by analyzing the GM pattern along consecutive fields, for example by detecting an increase or decrease in GM in consecutive fields that exceeds a scene detection threshold. Once a scene change is detected that corresponds to a particular image, encoding parameters of encoder/decoder 102 can be adjusted to achieve better results. For example, the detection of a scene change can be used to trigger the start of a new group of pictures (GOP). In another example, the encoder/decoder 102 responds to a scene change detection by adjusting the values of QP to compensate for the scene change, by enabling or disabling video filters or by adjusting or adapting other parameters of the encoding, decoding, transcoding or other processing by encoder/decoder 102.

Weighted prediction module 232 operates to compensate for the sensitivity to between-frame illumination variations in inter prediction of the video encoding. In this fashion, gradual changes in picture luminance such as slow fade-ins and fade-outs or other variations can be detected and compensated. In an embodiment, weighted prediction module 232 can detect when weighted prediction should or should not be employed and, when applied, further determines weighted prediction parameters to be used by one or more other modules of the video encoder/decoder 102 to compensate for luminance variations. For example, weighted prediction can result in not only residual bit saving, but also improvements in both motion estimation and scene detection which can influence coding efficiency and visual quality.

Further details regarding the operation of weighted prediction module 232 including several optional functions and features are described in conjunction with FIGS. 8-13 that follow.

While not expressly shown, video encoder/decoder 102 can include a memory cache, shared memory, a memory management module, a comb filter or other video filter, and/or other module to support the encoding of video signal 110 into processed video signal 112. Further details of general encoding and decoding processes will be described in greater detail in conjunction with FIGS. 6 and 7.

Figure 6:
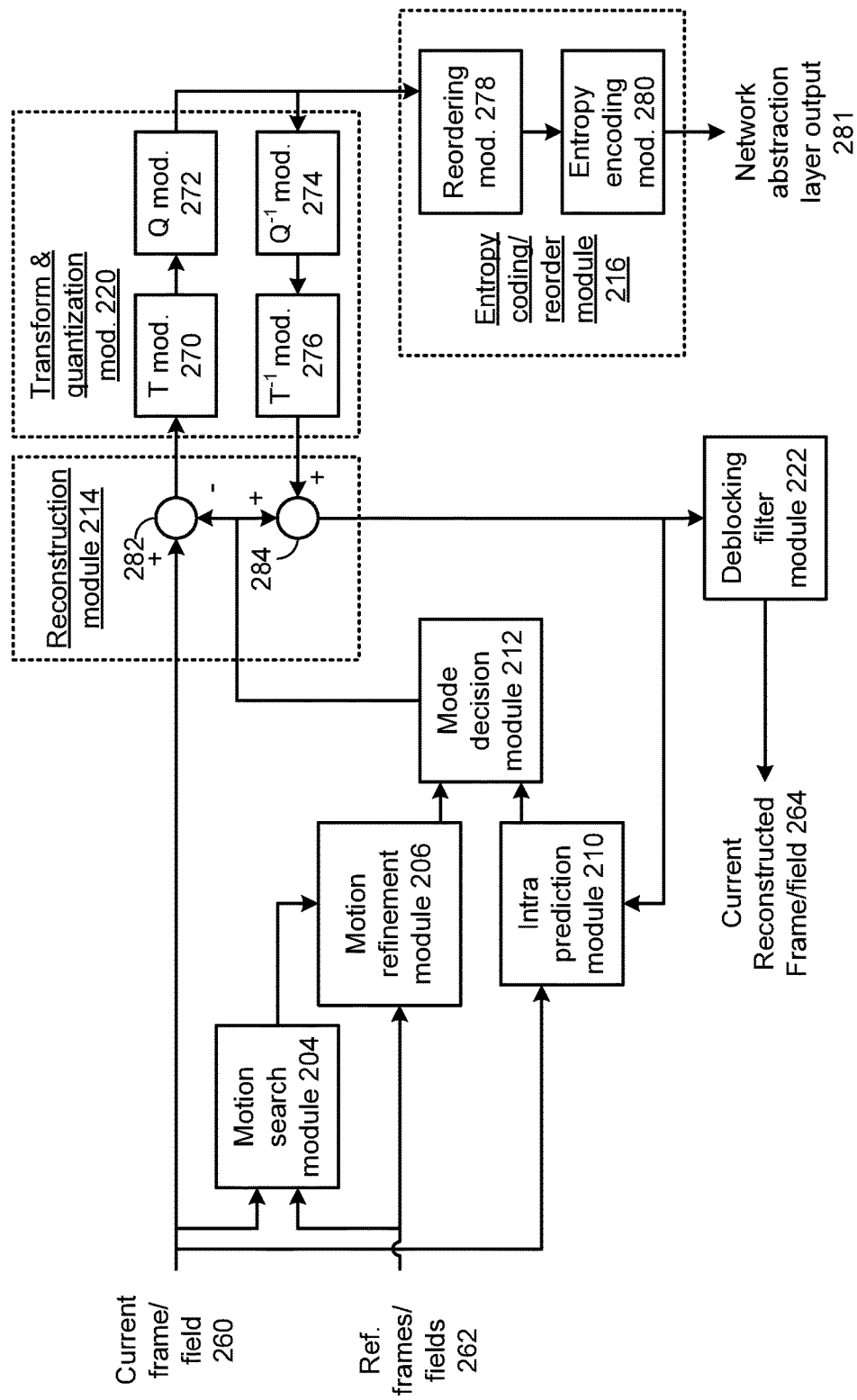
FIG. 6 presents a block flow diagram of a video encoding operation in accordance with an embodiment of the present disclosure.

FIG. 6 presents a block flow diagram of a video encoding operation in accordance with an embodiment of the present disclosure. In particular, an example video encoding operation is shown that uses many of the function specific modules described in conjunction with FIG. 5 to implement a similar encoding operation. Motion search module 204 generates a motion search motion vector for each macroblock of a plurality of macroblocks based on a current frame/field 260 and one or more reference frames/fields 262. Motion refinement module 206 generates a refined motion vector for each macroblock of the plurality of macroblocks, based on the motion search motion vector. Intra-prediction module 210 evaluates and chooses a best intra prediction mode for each macroblock of the plurality of macroblocks. Mode decision module 212 determines a final motion vector for each macroblock of the plurality of macroblocks based on costs associated with the refined motion vector, and the best intra prediction mode.

Reconstruction module 214 generates residual pixel values corresponding to the final motion vector for each macroblock of the plurality of macroblocks by subtraction from the pixel values of the current frame/field 260 by difference circuit 282 and generates unfiltered reconstructed frames/fields by re-adding residual pixel values (processed through transform and quantization module 220) using adding circuit 284. The transform and quantization module 220 transforms and quantizes the residual pixel values in transform module 270 and quantization module 272 and re-forms residual pixel values by inverse transforming and dequantization in inverse transform module 276 and dequantization module 274. In addition, the quantized and transformed residual pixel values are reordered by reordering module 278 and entropy encoded by entropy encoding module 280 of entropy coding/reordering module 216 to form network abstraction layer output 281.

Deblocking filter module 222 forms the current reconstructed frames/fields 264 from the unfiltered reconstructed frames/fields. It should also be noted that current reconstructed frames/fields 264 can be buffered to generate reference frames/fields 262 for future current frames/fields 260.

As discussed in conjunction with FIG. 5, one or more of the modules of video encoder/decoder 102 can also be used in the decoding process as will be described further in conjunction with FIG. 7.

Figure 7:
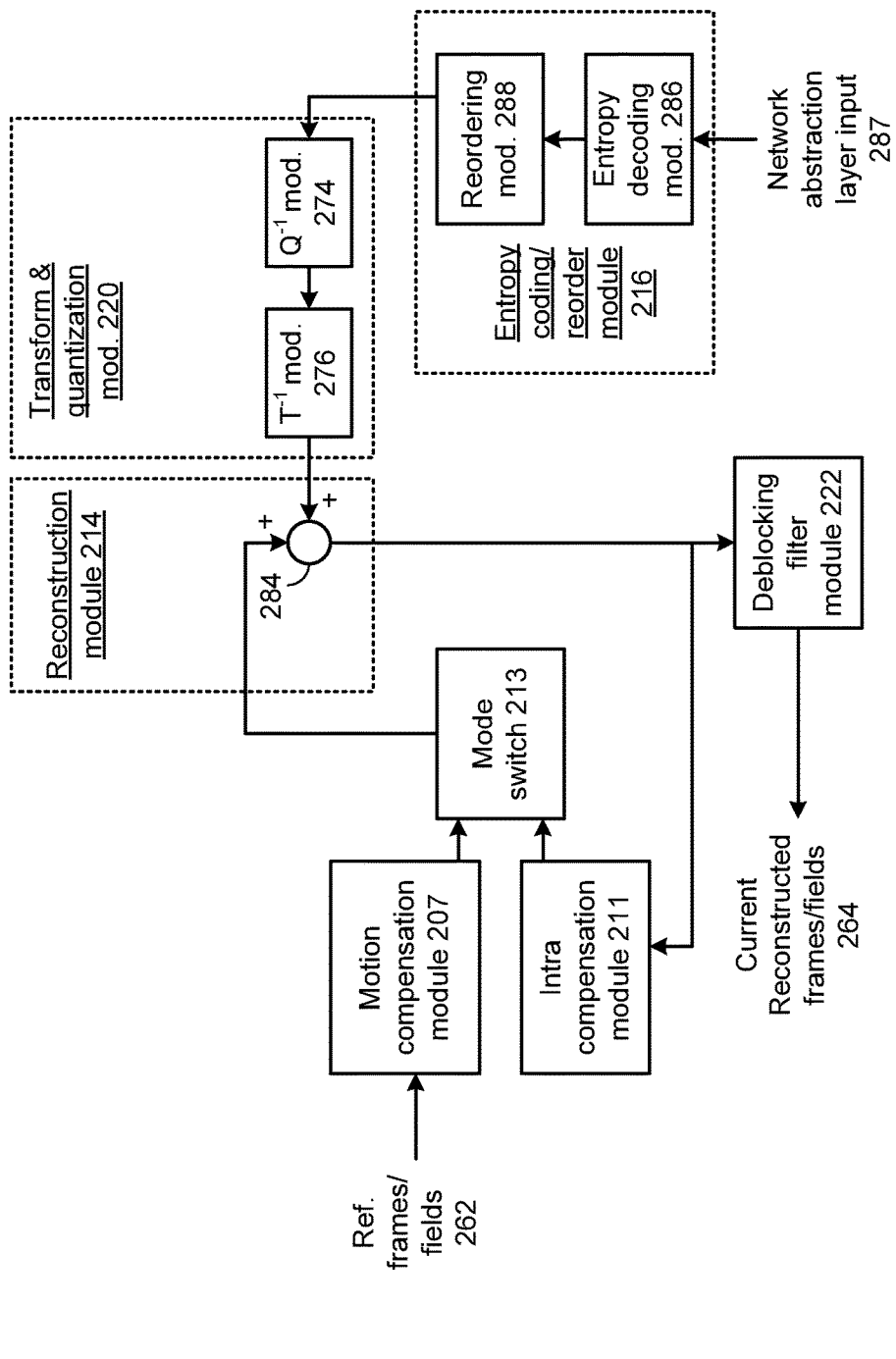
FIG. 7 presents a block flow diagram of a video decoding operation in accordance with an embodiment of the present disclosure.

FIG. 7 presents a block flow diagram of a video decoding operation in accordance with an embodiment of the present disclosure. In particular, this video decoding operation contains many common elements described in conjunction with FIG. 6 that are referred to by common reference numerals. In this case, the motion compensation module 207, the intra-compensation module 211, the mode switch 213, process reference frames/fields 262 to generate current reconstructed frames/fields 264. In addition, the reconstruction module 214 reuses the adding circuit 284 and the transform and quantization module reuses the inverse transform module 276 and the inverse quantization module 274. It should be noted that while entropy coding/reorder module 216 is reused, instead of reordering module 278 and entropy encoding module 280 producing the network abstraction layer output 281, network abstraction layer input 287 is processed by entropy decoding module 286 and reordering module 288.

While the reuse of modules, such as particular function specific hardware engines, has been described in conjunction with the specific encoding and decoding operations of FIGS. 6 and 7, the present disclosure can likewise be similarly employed to the other embodiments of the present disclosure described in conjunction with FIGS. 1-5 and 8-14 and/or with other function specific modules used in conjunction with video encoding and decoding.

FIG. 8 presents a block diagram representation of a weighted prediction module in accordance with an embodiment of the present disclosure. In particular, a weighted prediction module 232 is presented that includes a weighted prediction parameter generation module 250, a weighted prediction parameter refinement module 260, and a weighted prediction flag generation module 270. Because illumination variations are frequently accompanied by different types of motion, it can be difficult to estimate weighted prediction parameters accurately. The weighted prediction module 232 employs a multi-layer methodology to accurately determine the parameters of weighted prediction.

In an embodiment, the weighted prediction parameter generation module 250 is configured to generate a plurality of initial weighted prediction parameters 252, to analyze the plurality of initial weighted prediction parameters, and to generate a refinement flag 254 that indicates whether parameter refinement is enabled or disabled. The plurality of initial weighted prediction parameters 252 can be generated based on picture data 245—by considering two successive pictures of the sequence of pictures. It should be noted that the picture data 245 can be full-resolution. However, picture data 245 at a downscaled resolution can also be employed, particularly in circumstances where motion compensation and/or scene change detection is performed based on downscaled picture data and such downscaled picture data is readily available to the weighted prediction module 232.

In one mode of operation, the plurality of initial weighted prediction parameters 252 can include a first parameter generated based on a first sum of variance data for a first picture and a second sum of variance data for a second picture and a second parameter generated based on a third sum of gray-level data for a first picture and a fourth sum of gray-level data for the second picture—wherein the second picture is next in the sequence of pictures from the first picture. In another mode of operation, the first parameter is generated based on a first sum of absolute differences between pixel data and pixel mean data for a first picture and a second sum of absolute differences between pixel data and pixel mean data for a second picture. The refinement flag 254 can be generated by comparing the plurality of initial weighted prediction parameters 252 to a corresponding plurality of weighted prediction parameter values.

An example of operation of weighted prediction parameter generation module 250 is presented as follows. First, the sum of gray levels and sum of block variances of each picture are determined or gathered from other analysis by encoder/decoder 102 such as byproducts of QP adjustment or other analysis. Two weighted prediction parameters are determined. A scaling factor, FactorEstimated, and an offset value, offset Estimated, are determined as follows:

$$\text{FactorEstimated} = \text{sqrt}(\text{sumVar}_{i+1}/\text{sumVar}_i)$$

$$\text{offsetEstimated} = \text{sumLevel}_{i+1} - \text{factorEstimated} \ast \text{sumLevel}_i.$$

The values $\text{sumVar}_{i+1}$ and $\text{sumVar}_i$ represent sums of picture block illumination variances for pictures i+1 and i in the sequence and $\text{sumLevel}_{i+1}$ and $\text{sumLevel}_i$ represent the sums of the gray levels for pictures i+1 and i. If block variances cannot be obtained easily from other operations of encoder/decoder 102, the sum of absolute differences between pixel values and the mean value of pictures i30 1 and i ($\text{sumAbsDiff}_{i+1}$, $\text{sumAbsDiff}_i$) can be determined and used instead. In this case, $$\text{FactorEstimated} = \text{sumAbsDiff}_{i+1}/\text{sumAbsDiff}_i.$$

If FactorEstimated≈1 and offsetEstimated≈0, there is no need for weighted prediction and the refinement flag 254 is set to refinement disabled. Otherwise, the refinement flag 254 is set to indicate that refinement is enabled. In an embodiment, these conditions are determined based on when:

$$[1+\epsilon > \text{FactorEstimated} > 1-\epsilon] \text{ and}$$
$$[\epsilon > \text{offsetEstimated} > -\epsilon]$$

The value of $\epsilon$ can be a predetermined constant or can vary based on the values of QP. Also note that while the same value of $\epsilon$ is used for testing FactorEstimated and offsetEstimated above, different values can likewise be employed. In particular, separate values of $\epsilon$ can be determined based on the expected tolerance of each calculation, the value of QP and bearing in mind that the condition to be tested is that FactorEstimated≈1 and offsetEstimated≈0.

The weighted prediction parameter refinement module 260 operates when the refinement flag 254 indicates that refinement is enabled. In operation the weighted prediction parameter refinement module 260 is configured to generate a plurality of refined weighted prediction parameters 262 by refining the plurality of initial weighted prediction parameters 252. In an embodiment, the weighted prediction parameter refinement module 260 generates a joint intensity histogram for a first picture and a second picture, wherein the second picture is next in the sequence of pictures from the first picture.

The further operation of weighted prediction parameter refinement module 260 can be described in conjunction with FIGS. 9-12 which present graphical representations of joint intensity histograms in accordance with an embodiment of the present disclosure. Each joint intensity histogram presents a scatter diagram that plots points that represent, for each pixel, the gray level in picture i against the gray level in picture i+1. In circumstances where the gray levels are same, the pixel luminance is not changed from one picture to the next and the point would appear on the diagonal line with a slope of 1. In FIG. 9, the pixel values vary randomly by small values from the diagonal due to small variations from one picture to the next. In FIG. 10 however, the pixel values are shifted downward from the diagonal indicating a downward bias and slight fade of overall luminance. Analysis of such a joint intensity histogram can be used to refine the scaling factor and offset parameters for weighted prediction.

Figure 12:
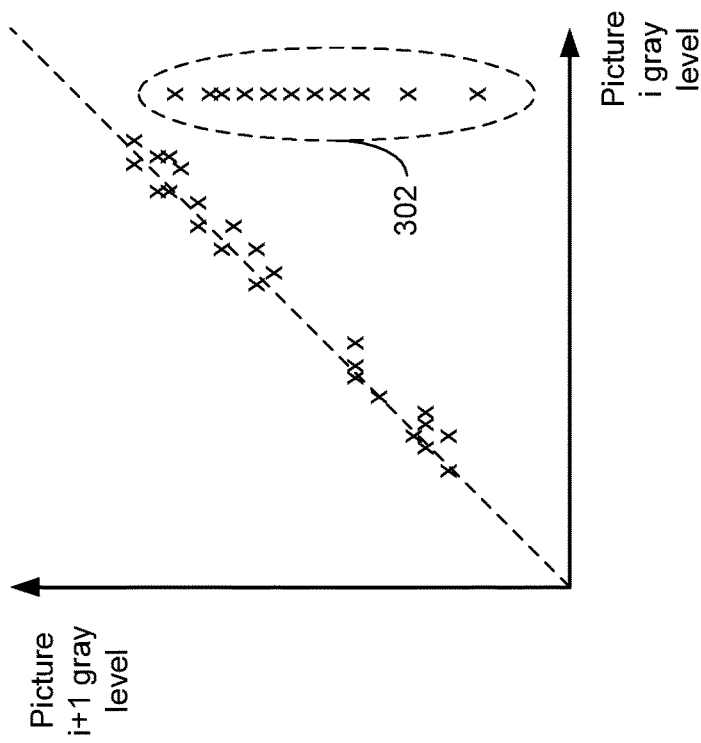
Figure 11:
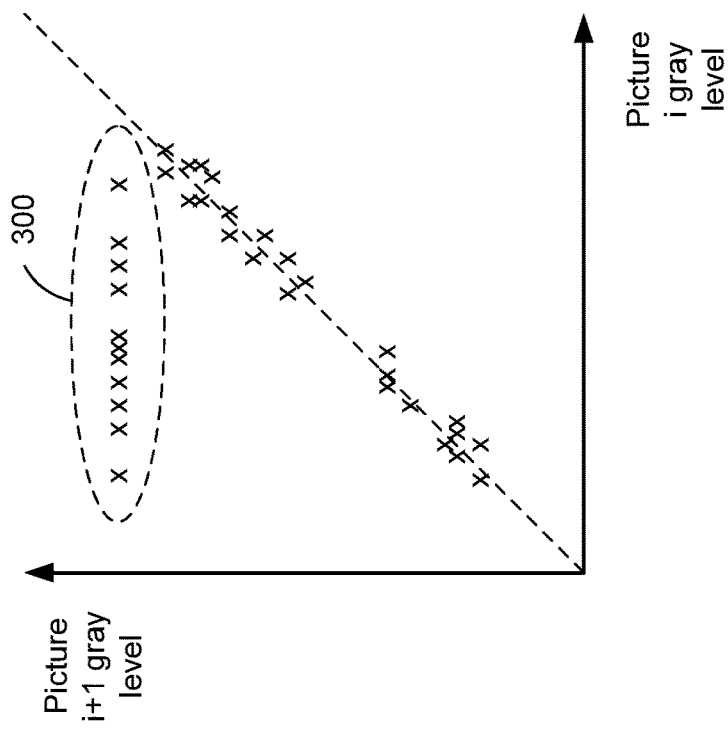

In addition to the weighted prediction parameter refinement, the weighted prediction parameter refinement module 260 can analyze the joint intensity histogram to detect other conditions such as a flash condition in at least one of the first picture and the second picture and indicate the flash condition by generating flash detection data 264 that indicates whether or not a flash condition is present. In FIG. 11, a region 300 includes several pixels from picture i that have changed in pixel i+1 to high gray levels. This indicates the beginning of a flash condition. In FIG. 12, a region 302 includes several pixels from picture i that have changed in pixel i+1 from high gray levels to other values. This indicates the ending of a flash condition. In an embodiment, weighted prediction is disabled by weighted prediction flag generation module 270 when a flash condition is present. The flash detection data 264 generated by weighted prediction parameter refinement module 260 can be used by other modules of encoder/decoder 102. For example, the scene change detection module 230 can operate based on the flash detection data 264 to avoid prematurely triggering a scene change in response to a flash condition.

The weighted prediction flag generation module 270 is configured to generate a weighted prediction flag 272 that indicates to either enable weighted prediction or disable weighted prediction. In one mode of operation, the weighted prediction flag generation module 270 sets the weighted prediction flag 272 to indicate that weighted prediction is disabled when the refinement flag 254 indicates that parameter refinement is disabled. Otherwise, when the refinement flag 254 indicates that parameter refinement is enabled, the weighted prediction flag generation module 270 generates the weighted prediction flag 272 based on an analysis of the plurality of refined weighted prediction parameters 262. In an embodiment, the weighted prediction flag generation module 270 generates Radon transformed weighted prediction parameters and generates the weighted prediction flag 272 based on a comparison of the plurality of refined weighted prediction parameters 262 and the Radon transformed weighted prediction parameters.

The operation of weighted prediction parameter refinement module 260 and weighted prediction flag generation module 270 can be described further in conjunction with the following example. As discussed above, a joint intensity histogram is generated based on picture data 245. A Radon transform in the narrow range of (factorEstimated+/−factorSearchRange, offsetEstimated+/−offsetSearchRange) is calculated. Refined weighted prediction parameters 262 are generated based on maximums determined from the joint intensity histogram. If the differences between the refined weighted prediction parameters 262 and the transform results are less than a detection threshold, there is no need for weighted prediction and the weighted prediction flag is set to indicate that weighted prediction is disabled. Otherwise the refined weighted prediction parameters 262 are output as the weighted prediction parameters 274 and the weighted prediction flag 272 is set to indicate that weighted prediction is enabled.

Figure 13:
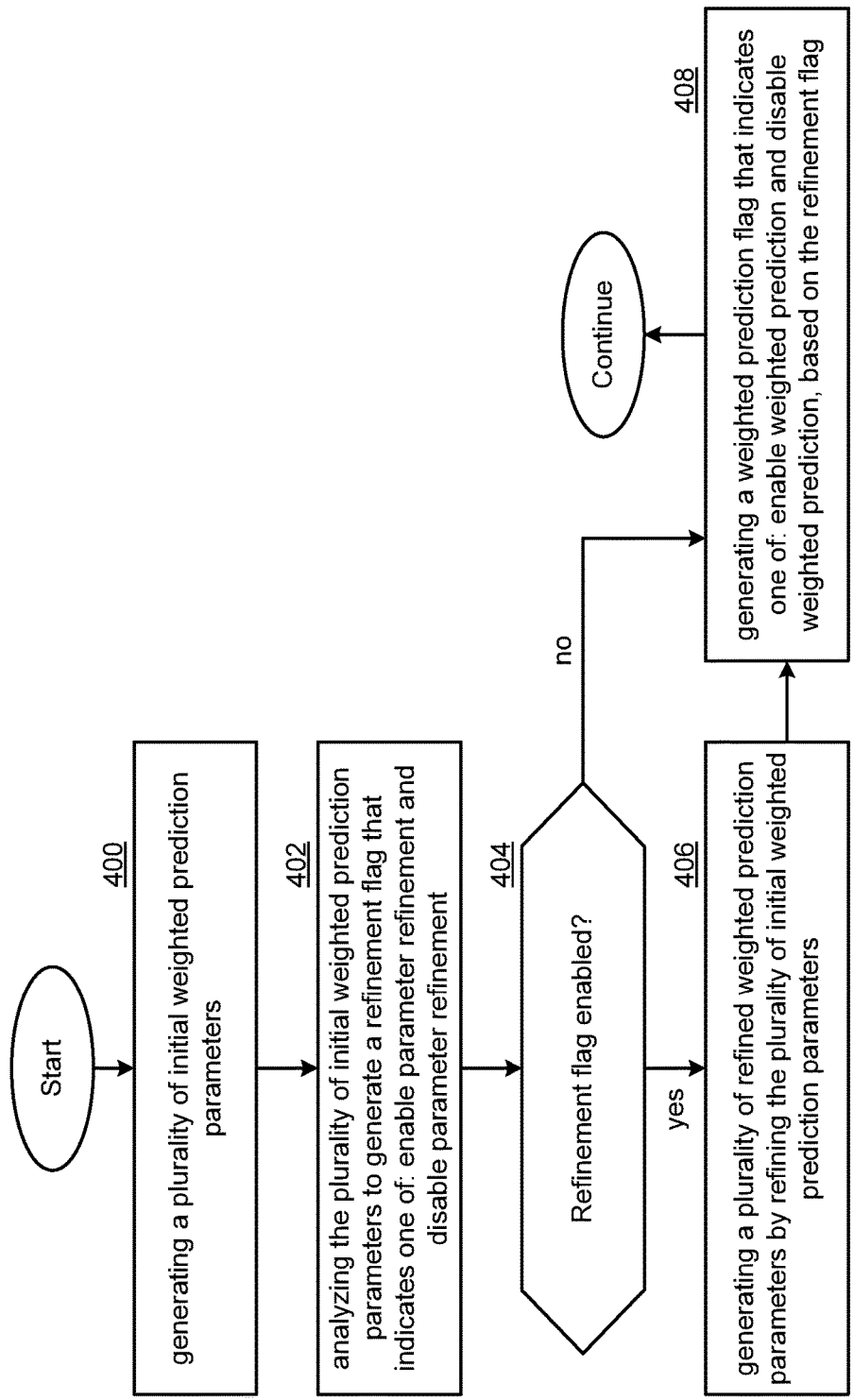
FIG. 13 presents a flowchart representation of a method in accordance with an embodiment of the present disclosure.

FIG. 13 presents a flowchart representation of a method in accordance with an embodiment of the present disclosure. In particular, a method is presented for use in conjunction with a video processing device having one or more of the features and functions described in association with FIGS. 1-12. Step 400 includes generating a plurality of initial weighted prediction parameters. Step 402 includes analyzing the plurality of initial weighted prediction parameters to generate a refinement flag that indicates one of: enable parameter refinement and disable parameter refinement. In step 404, the method considers if refinement is enabled. If so the method proceeds to step 406 to generate a plurality of refined weighted prediction parameters by refining the plurality of initial weighted prediction parameters and proceeding to step 408. Otherwise the method skips directly to step 408 to generate a weighted prediction flag that indicates one of: enable weighted prediction and disable weighted prediction, based on the refinement flag.

In an embodiment, the weighted prediction flag is generated to indicate that weighted prediction is disabled when the refinement flag indicates that parameter refinement is disabled. The refinement flag can be generated in step 402 by comparing the plurality of initial weighted prediction parameters to a corresponding plurality of weighted prediction parameter values. Step 406 can include generating a joint intensity histogram for a first picture and a second picture, wherein the second picture is next in the sequence of pictures from the first picture. The method can further include detecting a flash condition based on the joint intensity histogram.

Step 408 can include analyzing the plurality of refined weighted prediction parameters, when the refinement flag indicates that parameter refinement is enabled. This analysis can include generating Radon transformed weighted prediction parameters and comparing the plurality of refined weighted prediction parameters and the Radon transformed weighted prediction parameters.

Figure 14:
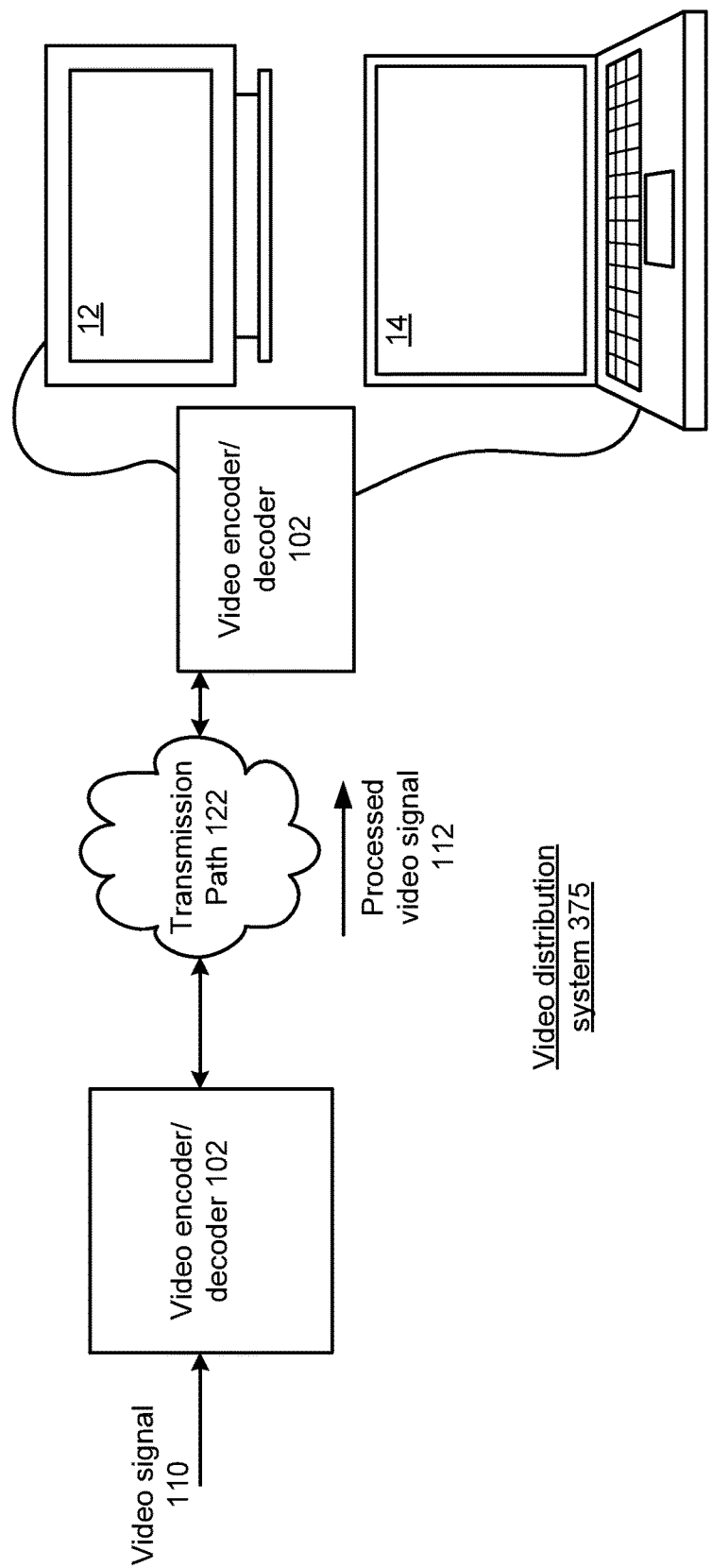
FIG. 14 presents a block diagram representation of a video distribution system 375 in accordance with an embodiment of the present disclosure.

FIG. 14 presents a block diagram representation of a video distribution system 375 in accordance with an embodiment of the present disclosure. In particular, processed video signal 112 is transmitted from a first video encoder/decoder 102 via a transmission path 122 to a second video encoder/decoder 102 that operates as a decoder. The second video encoder/decoder 102 operates to decode the processed video signal 112 for display on a display device such as television 12, computer 14 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 15:
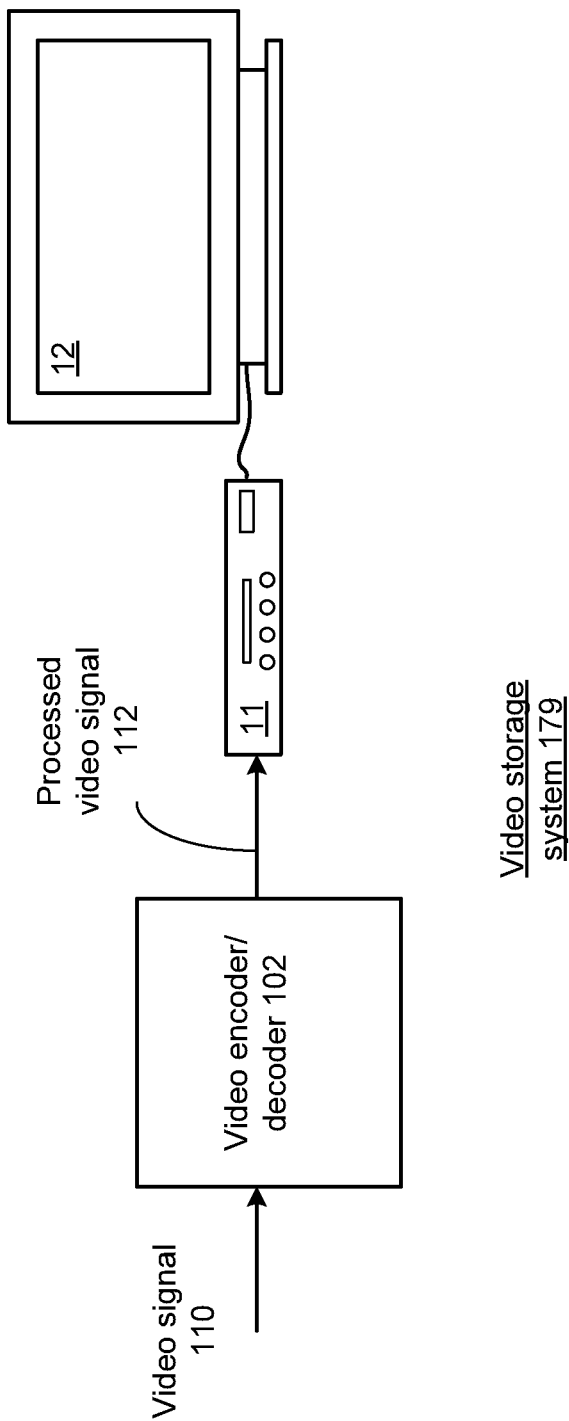
FIG. 15 presents a block diagram representation of a video storage system 179 in accordance with an embodiment of the present disclosure.

FIG. 15 presents a block diagram representation of a video storage system 179 in accordance with an embodiment of the present disclosure. In particular, device 11 is a set top box with built-in digital video recorder functionality, a stand alone digital video recorder, a DVD recorder/player or other device that stores the processed video signal 112 for display on video display device such as television 12. While video encoder/decoder 102 is shown as a separate device, it can further be incorporated into device 11. In this configuration, video encoder/decoder 102 can further operate to decode the processed video signal 112 when retrieved from storage to generate a video signal in a format that is suitable for display by video display device 12. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present disclosure as described herein.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A weighted prediction module for use in a video encoder that processes a video signal including a sequence of pictures, the weighted prediction module comprising:
   processing hardware that includes:
      a weighted prediction parameter generation module configured to generate a plurality of initial weighted prediction parameters, to analyze the plurality of initial weighted prediction parameters, and to generate a refinement flag that indicates one of: enable parameter refinement or disable parameter refinement, wherein the plurality of initial weighted prediction parameters include:
         a first parameter generated based on a first sum of absolute differences between pixel data and pixel mean data for a first picture and a second sum of absolute differences between the pixel data and the pixel mean data for a second picture; and
         a second parameter generated based on a third sum of gray-level data for the first picture and a fourth sum of gray-level data for the second picture;
      a weighted prediction parameter refinement module, coupled to the weighted prediction parameter generation module, that, when the refinement flag indicates that the parameter refinement is enabled, is configured to generate a plurality of refined weighted prediction parameters by refining the plurality of initial weighted prediction parameters; and
      a weighted prediction flag generation module, coupled to the weighted predication parameter generation module and the weighted prediction parameter refinement module configured to generate a weighted prediction flag that indicates one of: enable weighted prediction or disable weighted prediction, based on the refinement flag.

2. The weighted prediction module of claim 1 wherein the weighted prediction flag generation module sets the weighted prediction flag to indicate that the weighted prediction is disabled when the refinement flag indicates that the parameter refinement is disabled.

3. The weighted prediction module of claim 1 wherein the plurality of initial weighted prediction parameters include:
   a first parameter generated based on a first sum of variance data for a first picture and a second sum of variance data for a second picture; and
   a second parameter generated based on a third sum of gray-level data for a first picture and a fourth sum of gray-level data for the second picture.

4. The weighted prediction module of claim 1 wherein the second picture is next in the sequence of pictures from the first picture.

5. The weighted prediction module of claim 1 wherein the weighted prediction parameter generation module generates the refinement flag by comparing the plurality of initial weighted prediction parameters to a corresponding plurality of weighted prediction parameter values.

6. The weighted prediction module of claim 1 wherein the weighted prediction parameter refinement module generates a joint intensity histogram for a first picture and a second picture, wherein the second picture is next in the sequence of pictures from the first picture.

7. The weighted prediction module of claim 6 wherein the weighted prediction parameter refinement module further analyzes the joint intensity histogram to detect a flash condition in at least one of the first picture and the second picture.

8. The weighted prediction module of claim 1 wherein the weighted prediction flag generation module generates the weighted prediction flag based on an analysis of the plurality of refined weighted prediction parameters when the refinement flag indicates that the parameter refinement is enabled.

9. The weighted prediction module of claim 8 wherein the weighted prediction flag generation module generates Radon transformed weighted prediction parameters and generates the weighted prediction flag based on a comparison of the plurality of refined weighted prediction parameters and the Radon transformed weighted prediction parameters.

10. A method for use in a video encoder that processes a video signal including a sequence of pictures, the method comprising:
   generating a plurality of initial weighted prediction parameters wherein the plurality of initial weighted prediction parameters include:
      a first parameter generated based on a first sum of absolute differences between pixel data and pixel mean data for a first picture and a second sum of absolute differences between the pixel data and the pixel mean data for a second picture; and
      a second parameter generated based on a third sum of gray-level data for the first picture and a fourth sum of gray-level data for the second picture;
   analyzing the plurality of initial weighted prediction parameters to generate a refinement flag that indicates one of: enable parameter refinement and disable parameter refinement;

when the refinement flag indicates that the parameter refinement is enabled, generating a plurality of refined weighted prediction parameters by refining the plurality of initial weighted prediction parameters; and generating a weighted prediction flag that indicates one of: enable weighted prediction and disable weighted prediction, based on the refinement flag.

11. The method of claim 10 wherein the weighted prediction flag is generated to indicate that the weighted prediction is disabled when the refinement flag indicates that the parameter refinement is disabled.

12. The method of claim 10 wherein the refinement flag is generated by comparing the plurality of initial weighted prediction parameters to a corresponding plurality of weighted prediction parameter values.

13. The method of claim 10 wherein refining the plurality of initial weighted prediction parameters includes generating a joint intensity histogram for a first picture and a second picture, wherein the second picture is next in the sequence of pictures from the first picture.

14. The method of claim 13 further comprising:
 detecting a flash condition based on the joint intensity histogram.

15. The method of claim 10 wherein generating the weighted prediction flag includes analyzing the plurality of refined weighted prediction parameters, when the refinement flag indicates that the parameter refinement is enabled.

16. The method of claim 10 further comprising:
 generating Radon transformed weighted prediction parameters;
 wherein generating the weighted prediction flag includes comparing the plurality of refined weighted prediction parameters and the Radon transformed weighted prediction parameters.

* * * * *